United States Patent
Kravchenko

(10) Patent No.: US 11,505,224 B2
(45) Date of Patent: Nov. 22, 2022

(54) STACKABLE ROLLING COOLERS WITH AFFIXED MAIN BIN

(71) Applicant: Alina Kravchenko, Houston, TX (US)

(72) Inventor: Alina Kravchenko, Houston, TX (US)

( * ) Notice: Subject to any disclaimer, the term of this patent is extended or adjusted under 35 U.S.C. 154(b) by 0 days.

(21) Appl. No.: 16/941,919

(22) Filed: Jul. 29, 2020

(65) Prior Publication Data

US 2020/0353962 A1 Nov. 12, 2020

Related U.S. Application Data

(62) Division of application No. 15/865,576, filed on Jan. 9, 2018, now Pat. No. 10,967,896.

(Continued)

(51) Int. Cl.
*B62B 5/00* (2006.01)
*F25D 3/06* (2006.01)
(Continued)

(52) U.S. Cl.
CPC ............... *B62B 1/006* (2013.01); *B62B 1/04* (2013.01); *B62B 1/14* (2013.01); *B62B 1/26* (2013.01);
(Continued)

(58) Field of Classification Search
CPC .. B62B 1/006; B62B 1/26; B62B 1/14; B62B 1/04; B62B 5/0083; B62B 2204/04; B62B 2204/06; F25D 2331/804; F25D 25/025; F25D 23/066; F25D 23/069; F25D 3/06; F25D 2303/08221

See application file for complete search history.

(56) References Cited

U.S. PATENT DOCUMENTS 4,724,681 A * 2/1988 Bartholomew ........... F25D 3/06
190/18 A
4,832,509 A * 5/1989 Merrifield ............ A47B 88/402
384/21

(Continued)

FOREIGN PATENT DOCUMENTS

DE 102017001936 A1 * 8/2018 ............... F25D 3/02
JP H1179261 A * 3/1999
WO WO-2014124479 A1 * 8/2014 ............. A45C 11/20

OTHER PUBLICATIONS

Gloo Ice Cube Roller Cooler: https://www.amazon.com/Igloo-Roller-Cooler-60-Quart-Ocean/dp/B002VQ9PU2.

(Continued)

*Primary Examiner* — Steve Clemmons
(74) *Attorney, Agent, or Firm* — Scot Fagerland

(57) ABSTRACT

This invention is directed to a kit of coolers that offers a number of improvements over the prior art. The coolers are modified to specifically accommodate frozen gel ice packs instead of ice cubes. Because there is no spill water, the coolers open with front-facing pull-out drawers. The coolers stack atop one another with interlocking parts. Easy transport is provided by a handle and wheels, which are attached to the bottom (main) bin. Internally, the cooler bins are compartmentalized horizontally or vertically with dividers. Hollow spaces within the walls and dividers of the bins accommodate frozen gel ice packs. Overall, the coolers are easier to pack and unpack, stack, load into a car, and transport on the ground than conventional ice chest coolers.

4 Claims, 9 Drawing Sheets

Related U.S. Application Data

(60) Provisional application No. 62/446,082, filed on Jan. 13, 2017.

(51) Int. Cl.

| | | |
|---|---|---|
| *B62B 1/00* | (2006.01) | |
| *B62B 1/04* | (2006.01) | |
| *B62B 1/26* | (2006.01) | |
| *B62B 5/06* | (2006.01) | |
| *F25D 3/08* | (2006.01) | |
| *B62B 1/14* | (2006.01) | |

(52) U.S. Cl.
CPC ............ *B62B 5/0083* (2013.01); *B62B 5/067* (2013.01); *F25D 3/06* (2013.01); *F25D 3/08* (2013.01); *B62B 2203/40* (2013.01); *B62B 2204/04* (2013.01); *B62B 2204/06* (2013.01); *F25D 2400/16* (2013.01); *F25D 2400/38* (2013.01)

(56) References Cited

U.S. PATENT DOCUMENTS

| | | | | |
|---|---|---|---|---|
| 4,932,548 | A * | 6/1990 | Bensinger | F25D 23/069 |
| | | | | 206/509 |
| 5,240,264 | A * | 8/1993 | Williams | B62B 3/006 |
| | | | | 211/194 |
| 5,890,613 | A | 4/1999 | Williams | |
| 6,431,580 | B1 * | 8/2002 | Kady | B62B 1/12 |
| | | | | 280/655 |
| 6,925,834 | B2 | 8/2005 | Fuchs | |
| 6,983,946 | B2 * | 1/2006 | Sullivan | B62B 1/002 |
| | | | | 206/511 |
| 7,004,323 | B1 * | 2/2006 | Symonds | A45C 11/20 |
| | | | | 206/542 |
| 8,474,274 | B2 * | 7/2013 | Schalla | A47B 31/02 |
| | | | | 62/89 |
| 8,657,307 | B2 * | 2/2014 | Lifshitz | B25H 3/02 |
| | | | | 280/47.18 |
| 9,366,467 | B2 * | 6/2016 | Kiedaisch | F25D 3/08 |
| 9,834,360 | B2 * | 12/2017 | Tanaka | F25D 3/08 |
| 10,473,390 | B2 * | 11/2019 | McCurry | F25D 31/005 |
| 2011/0220531 | A1 | 9/2011 | Meether et al. | |
| 2015/0369529 | A1 * | 12/2015 | Monroe | F25D 3/08 |
| | | | | 62/457.2 |

OTHER PUBLICATIONS

Coleman Xtreme 4: https://www.dickssportinggoods.com/p/coleman-xtreme-4-40-quart-rolling-cooler-16colu40qtwhldxtrodrxx—1/16colu40qtwhldxtrodrxx.
IRP Outdoors Grizzly Cooler: https://www.shopperschoice.com/item_item_2615210.html (Photo 2, divider).
Engel Deep Blue Cooler Dividers: https://www.tackledirect.com/engel-deepblue-cooler-dividers.html.
Coleman Party Stackable Cooler: https://www.4imprint.com/product/105525/Coleman-25-Quart-Party-Stacker-Cooler.
Iceberg Cooler: http://icebergcoolerco.com/aboutus/stackability.html.
ULine Long Dividers: https://www.uline.com/Product/Detail/S-16976LD/Plastic-Bins/Long-Divider-15-x-6?pricode=WY728&gadtype=pla&id=S-16976LD&gclid=Cj0KEQiA_eXEBRDP8fnl1JDXxslBEiQAAGfyoSvGkpbN06BQDcoNxenB0jplGC9lr8uUpAKHNQJE3gwaAoOS8P8HAQ&gclsrc=aw.ds.
Harloff drawer dividers: https://mfimedical.com/products/harloff-680503-drawer-divider-set?utm_source=google&utm_medium=cse&utm_term=harloff-680503-drawer-divider-set&gclid=CjwKCAiAvMPRBRBIEiwABuO6qYa361XVol9bNcGMYpz4EzH5TNcXhp0cnYGJ1TFovybPAdqBDKJG4BoC3qcQAvD_BwE.
Alfresco Under Counter Insulated Ice Drawer: https://www.bbqislandinc.com/alfresco-26-inch-under-counter-insulated-ice-drawer.html.

\* cited by examiner

STACKABLE ROLLING COOLERS WITH AFFIXED MAIN BIN

1. FIELD OF THE INVENTION

This invention is in the field of refrigeration, specifically cooled enclosures.

2. BACKGROUND OF THE INVENTION

A cooler is a great way to keep food and drinks cold when on the go. However, coolers fashioned on the ages-old "ice chest" model have a number of inconvenient features. I have invented a cooler that is ergonomically designed for maximal portability, access, and sanitation.

3. DESCRIPTION OF RELATED TECHNOLOGY

The conventional cooler is a carry-over of the ice chest. A chest is filled with ice, and food and beverages are merely positioned in or on the ice. The chest opens from the top so that melting ice does not spill out. The space inside a cooler is usually undivided.

There are now many more practical cooling agents than simple ice cubes. Cold packs are very popular because they are reusable and they don't spill. Coolers that use cold packs do not have to abide by the design limitations of conventional ice chests.

Keeping food and drinks in an ice chest cooler is impractical in a number of ways. It is difficult to search for a specific food or beverage item. It is difficult to sort foods according to temperature and fragility. If there are items on top of the cooler, the user is forced to remove those items in order to open the cooler. Ice is heavy, and the melt water must eventually be drained. This makes it difficult to lift and maneuver the cooler. Many coolers are too large for small vehicular spaces, especially in cars that are fully packed. It is also very difficult to access the contents of a cooler while driving a car.

4. SUMMARY OF THE INVENTION

The present invention addresses all of the design problems mentioned above. It is a kit of coolers that includes one or more bins. The bins are fashioned after drawers, not chests. That is, each bin opens with a pull-out drawer from the front.

The main bin includes wheels and an extendable pull-handle for easy rolling. It is much easier to roll a cooler around than to carry it everywhere.

The invention also includes various sizes of modular bins with drawers that pull out from the front. Each modular bin has indentations on top and protrusions on bottom. These bins stack and fit on top of each other like pieces of a puzzle: the protrusions on the bottom of one modular bin fit securely into the indentations of another modular bin. In the preferred embodiment, one or more modular bins stack on top of a main bin.

Each drawer seals airtight when shut, and is locked by a locking mechanism. A latch releases the locking mechanism that keeps each drawer secure in the bin.

The separate stackable bins allow the user to organize food items into specific categories of fragility and temperature. Dividers fit inside each drawer. These dividers and the drawer walls include pocket sections, which can accommodate jelly ice packs. This allows the user to keep various food items at different temperatures. These dividers really come in handy when shopping at the farmers' market, ensuring that eggs and bread don't get squashed beneath the watermelon! They also help organize food and beverages into types, with an area for labels on the front of each drawer. In addition, it will help save time for people going on the hunt for their favorite beverage.

The bins' drawers allow the user to place items such as a bag or drink on top of the cooler without worrying about removing it in order to get inside. In addition, the top of the cooler has indentations for the bottom of other bins to fit into like a puzzle. These top indentations can be used as drink holders, with a storage area in between for sandwiches or additional ice packs.

Another incredible solution that the invention provides is a mess-free and money-saving way to keep the contents of the cooler cold and dry, because of the reusable ice packs that slide into the separate compartments inside each wall of the cooler. The jelly material inside of each ice pack prevents condensation and keeps the items inside cold and dry. When they melt, their contents stay contained in the bags and can be placed in a freezer to reuse again. As mentioned above, inside each drawer there are hollow dividers. The user can place additional sections in these dividers, with or without ice packs, preventing items from shifting and keeping the items in the middle cold as well. The ice packs can be placed in a way that covers every side of the contents, with ice packs on the top, bottom, left, front, top, and bottom if needed.

The other great thing about the invention is that each drawer section is small enough to be lifted much more easily than a large bulky ice chest cooler, because of the modular bins that can be lifted one piece at a time. Each bin (including the main bin) has side handles toward the top, on the left and right sides of the bin, allowing the user to grip each bin and lift it up easily. This makes loading and unloading a car, for example, very easy. Each bin has grooves in the rear face, which fit securely into the extendable handles of the main bin. A small or weak person may choose to buy a main bin with a smaller compartment and several smaller bins.

This cooler configuration is ideal for travel by car. The modular bins are small enough to fit easily into a small trunk, even with other items there. Because the drawers open from the front, it is easy to access food items inside, even if the bins are in the trunk. In addition, the small modular bins allow the user to bring one particular bin (perhaps a small one packed with sandwiches, chips, and soda water for the road) with her inside the back seat of her car.

The "Stackable Rolling Cooler Bins with Drawers" kit includes: (1) A main bin, which includes an extendable handle and wheels with a drawer; (2) Modular bins, which can be stacked on top of one another in interlocking fashion like a puzzle, and which can also be stacked on top of the main bin; (3) Customized polypropylene grocery tote bags that can fit inside each bin, in various sizes to fit each bin and each section of the bins.

5. BRIEF DESCRIPTION OF THE DRAWINGS

Figure 1:
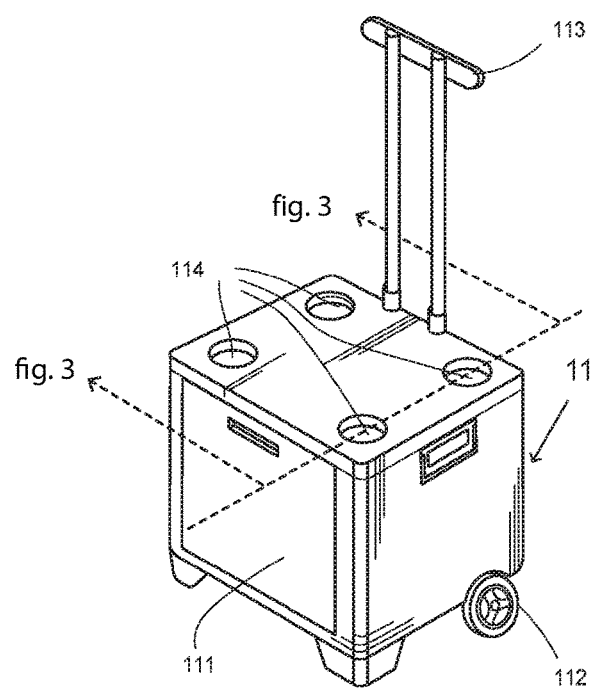
FIG. 1 shows the main bin with the drawer closed and the handle in extended position. This view shows the front-opening drawer, one of the wheels, a side handle, and the indentations on the top face of the main bin, which can be used as cup holders but are also used to accommodate the protrusions from a modular bin.
Figure 2:
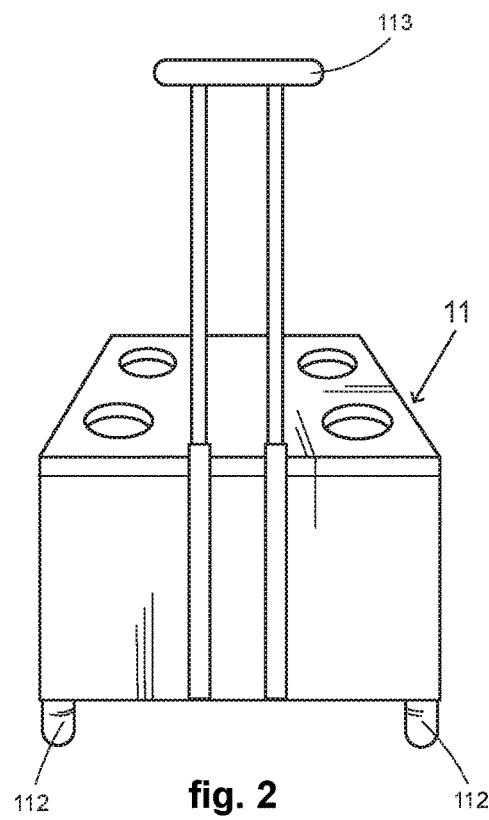
FIG. 2 is a back view of the main bin, showing how the extendable handle is attached.
Figure 3:
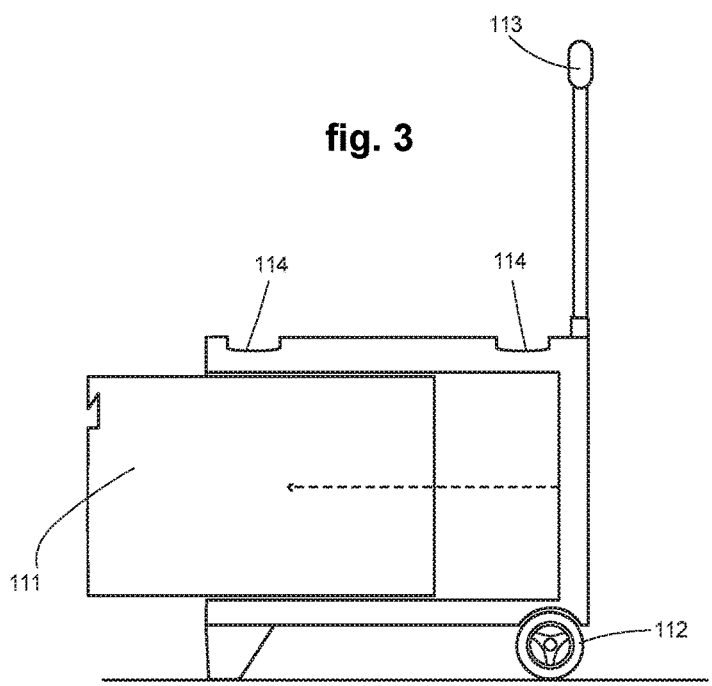
FIG. 3 is a cross-sectional view of the main bin, showing the drawer inside. The dashed arrow depicts the direction of motion of the drawer.
Figure 4:
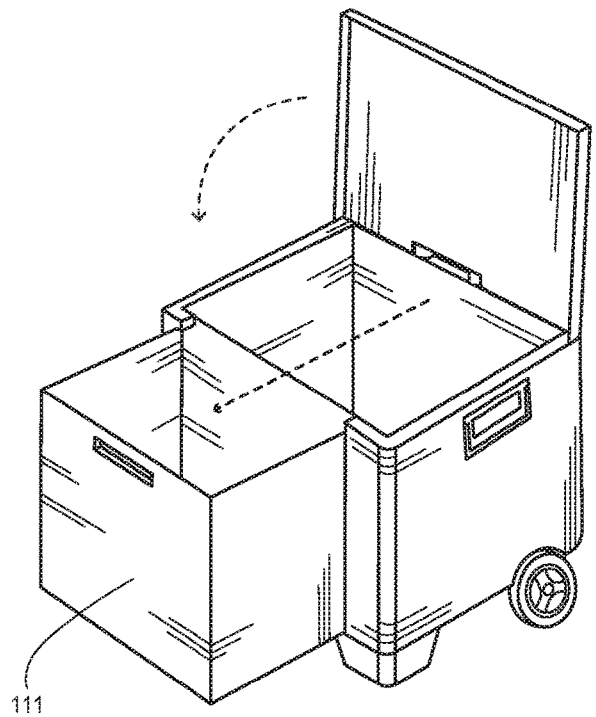

FIG. 4 shows the main bin with the drawer open and the handle collapsed. The straight dashed arrow depicts the direction of motion of the drawer. The arced dashed arrow shows the direction of motion of the top lid.

Figure 5:
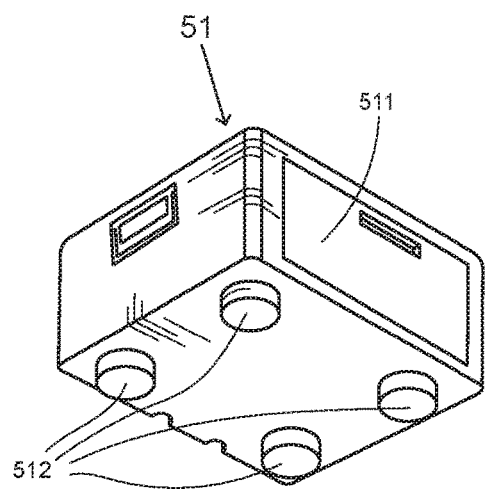

FIG. 5 is a first perspective view of a modular bin, showing the front-opening drawer, a side handle, and the protrusions on the bottom.

Figure 6:
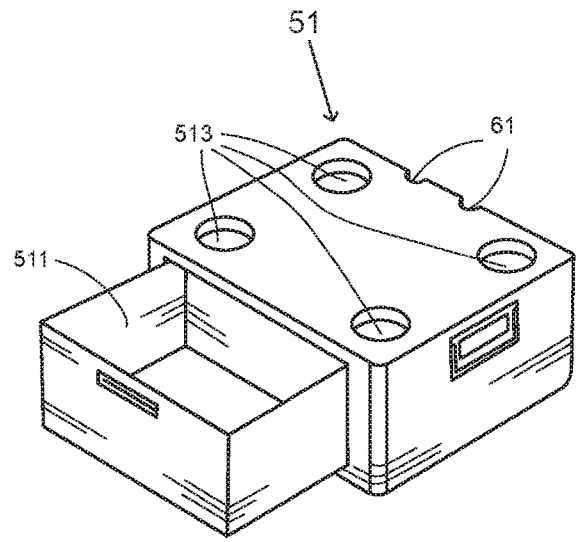

FIG. 6 is a second perspective view of a modular bin, with the drawer open. This view illustrates the indentations on the top surface of the bin.

Figure 7:
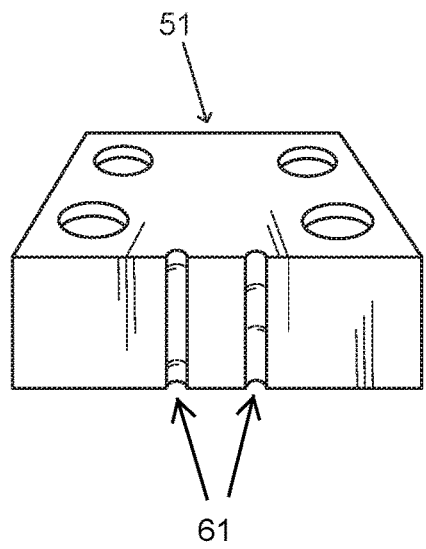

FIG. 7 is a third perspective view of a modular bin, showing the grooves on the rear face.

Figure 7A:
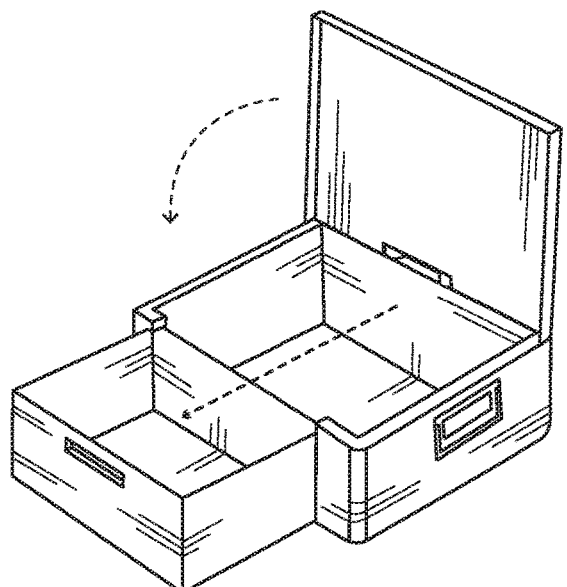

FIG. 7a is a fourth perspective view of a modular bin, this time with the top lid open. The straight dashed arrow depicts the direction of motion of the drawer. The arced dashed arrow shows the direction of motion of the top lid.

Figure 8:
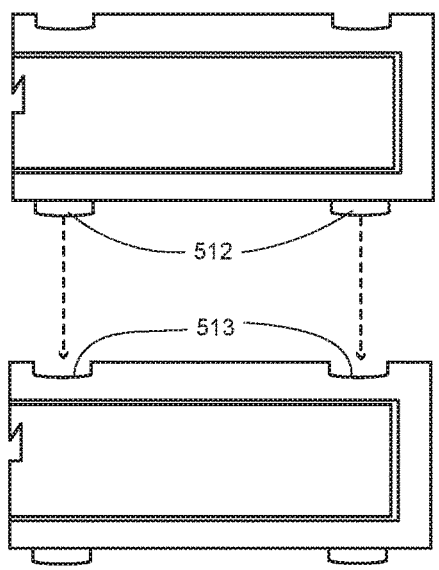

FIG. 8 is a first cross-sectional view of two modular bins, showing the drawers inside. In this figure, one bin is being lowered toward another one. The dashed arrows illustrate how the protrusions in the upper bin will fit into the indentations of the lower bin.

Figure 9:
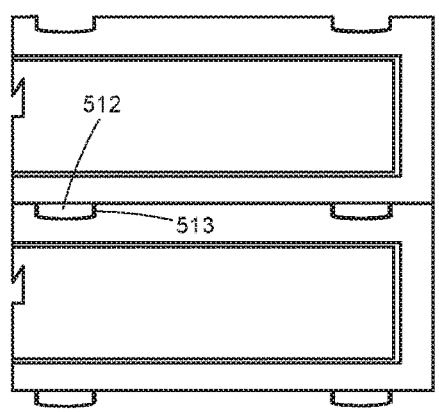

FIG. 9 is a second cross-sectional view of two modular bins. In this figure, one bin is securely in position on top of another one, with the protrusions of the upper bin locked in place in the indentations of the lower bin.

Figure 10:
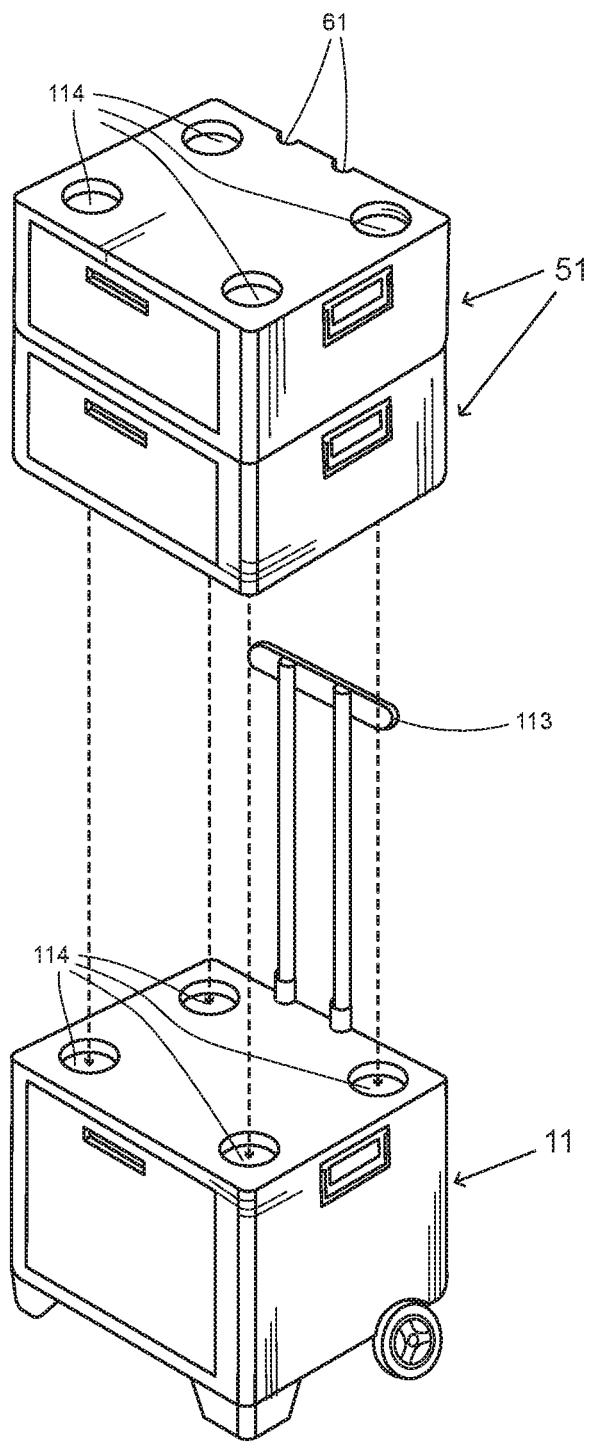

FIG. 10 shows two modular bins being lowered into position atop the main bin. The dashed arrows illustrate how the protrusions of the lower modular bin will fit into the indentations atop the main bin.

Figure 11:
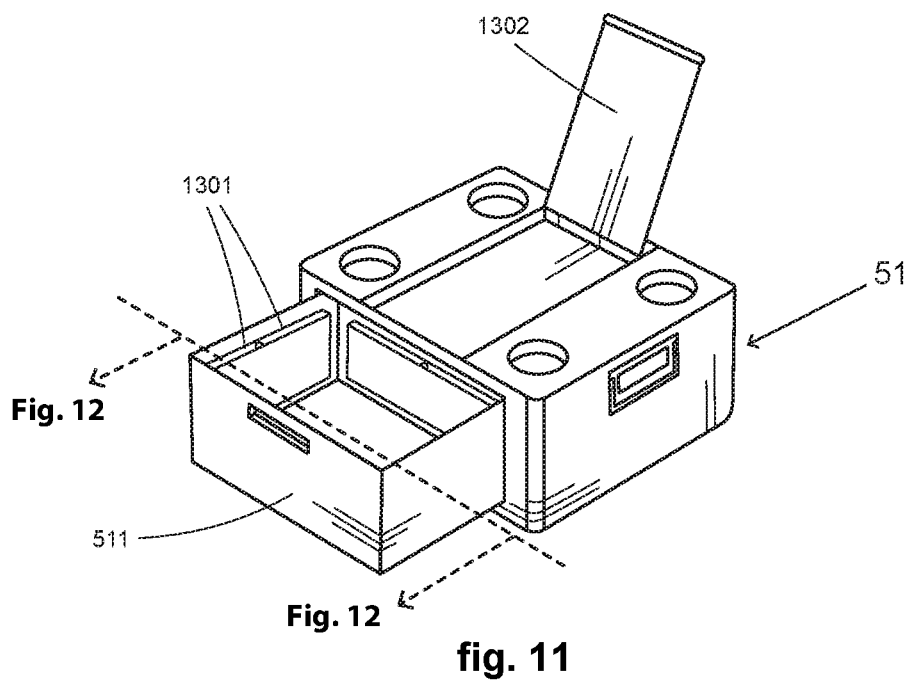

FIG. 11 shows a modular bin with space for ice packs. This figure shows a top flap open to reveal a space for ice packs. It also shows hollow space in the walls of the drawer, where ice packs can be stowed.

Figure 12:
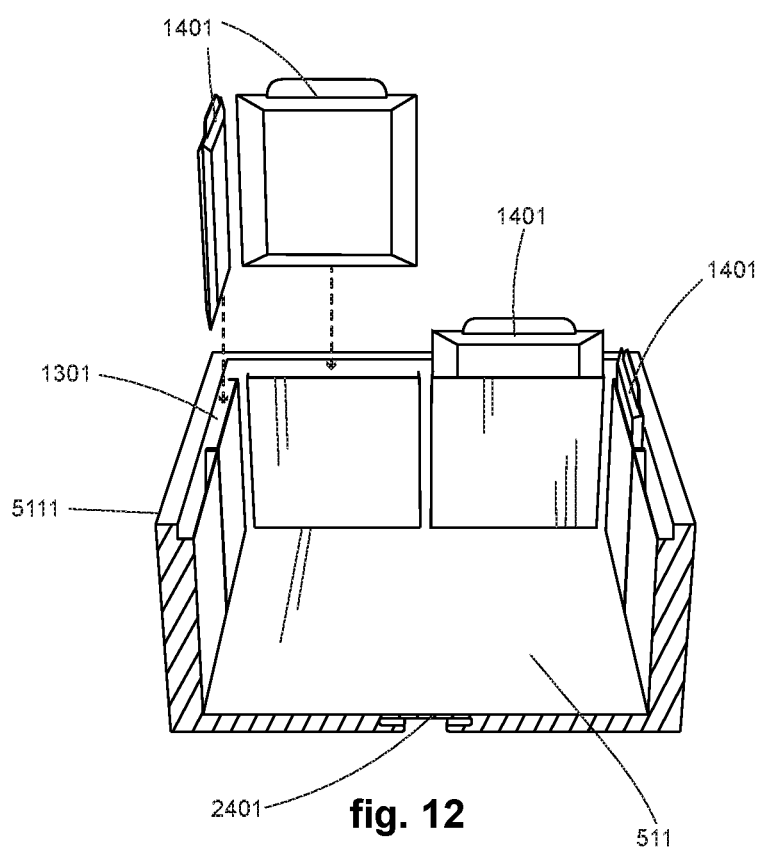

FIG. 12 shows ice packs being positioned into the hollow walls of a drawer.

Figures 13, 14, 15:
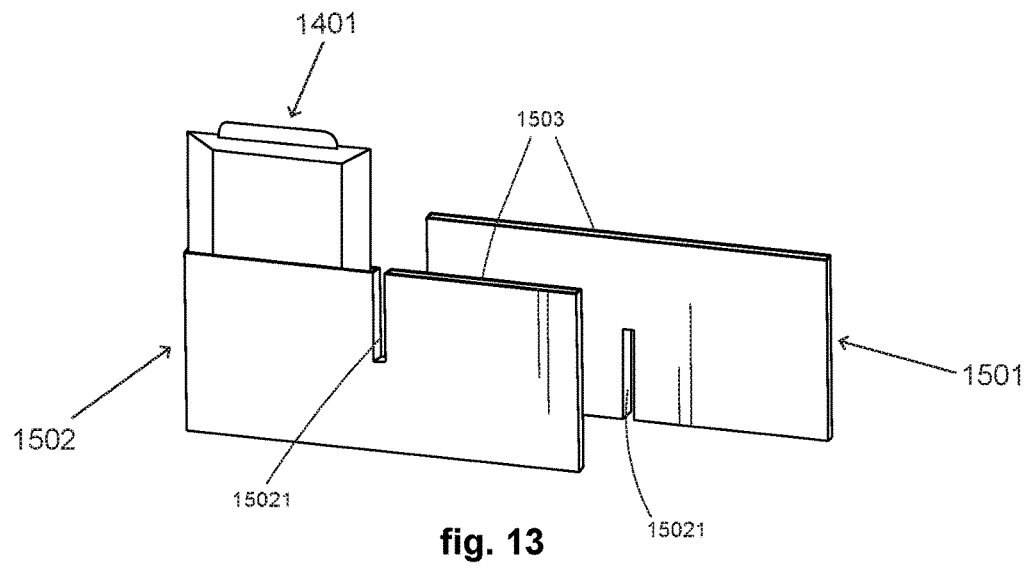

FIG. 13 shows two vertical drawer dividers, with an ice pack being inserted into the hollow recess of one divider. The figure shows a slot in each divider.

FIG. 14 shows two vertical dividers about to be fit together, with divider grooves aligned.

FIG. 15 shows two vertical dividers after they have been fit together. Each divider is now secured within the groove of the other divider.

Figure 16:
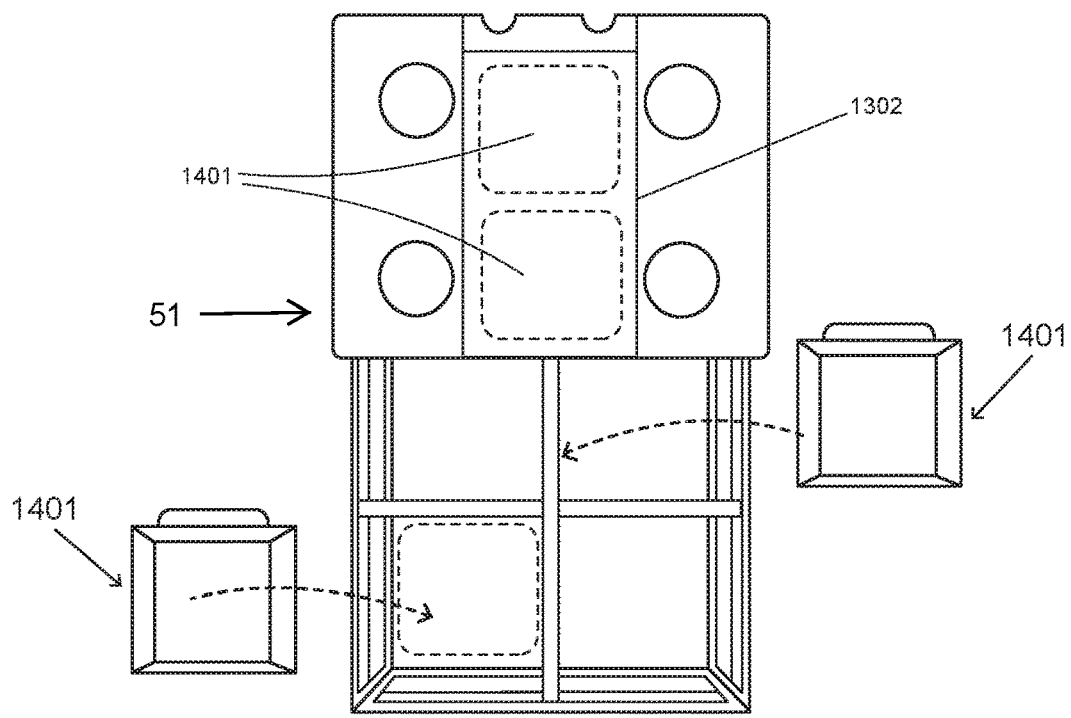

FIG. 16 is a top view of a modular bin. The figure shows one ice pack being positioned at the bottom of the drawer and another ice pack being positioned within the hollow recess of a divider. The dashed arrows represent the placement of the ice packs. The dashed rectangles represent ice packs, some of which are hidden beneath the top flap.

Figure 17:
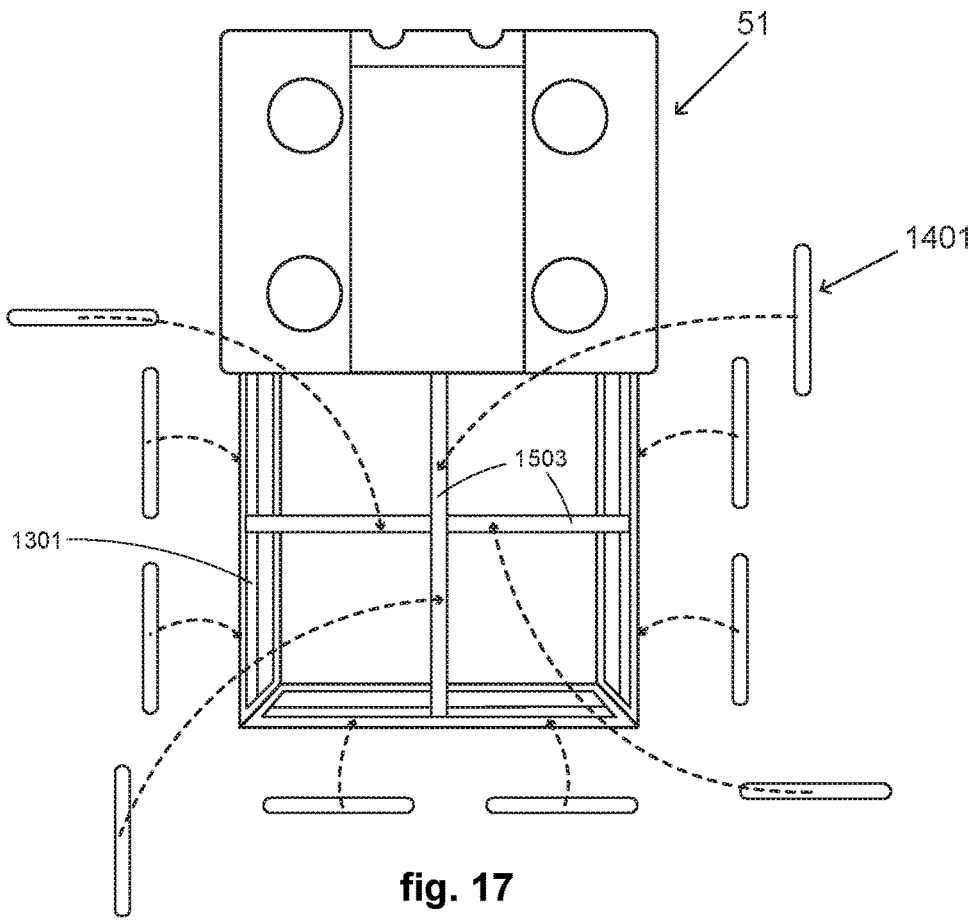

FIG. 17 is a second top view of a modular bin. This figure shows several ice packs being positioned in the hollow recesses of dividers and the walls of the drawer.

Figure 18:
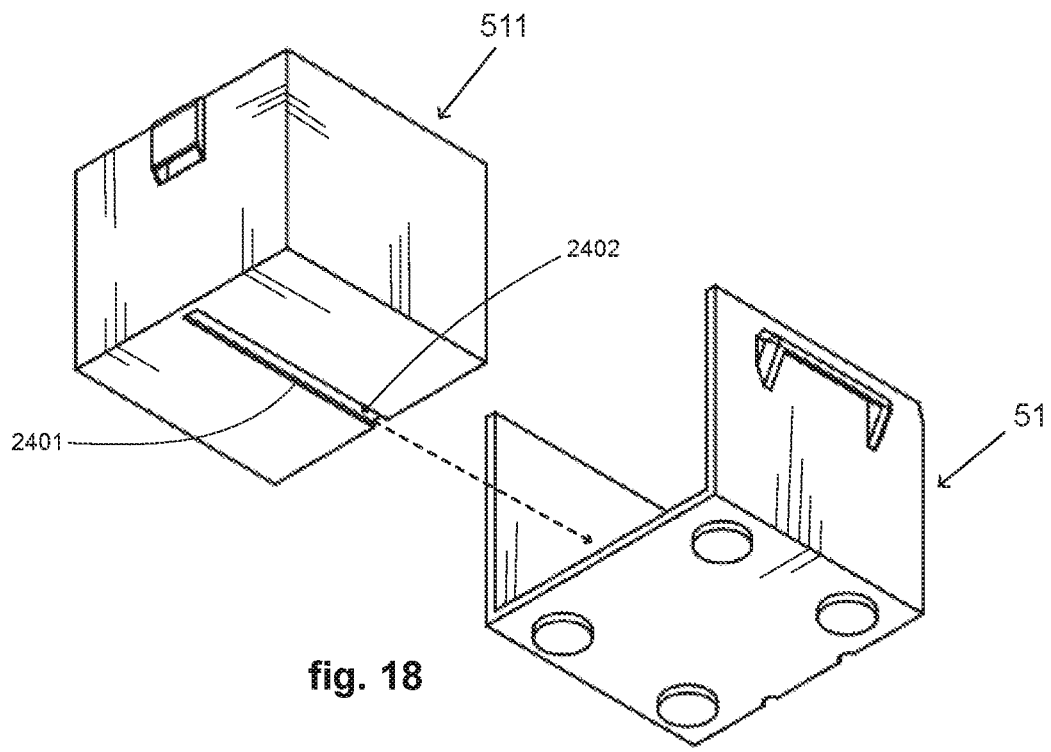

FIG. 18 shows the underside of a bin and drawer, and the mechanism that secures the drawer in the bin. The dashed arrow indicates the direction of motion of the drawer into the bin.

Figure 19:
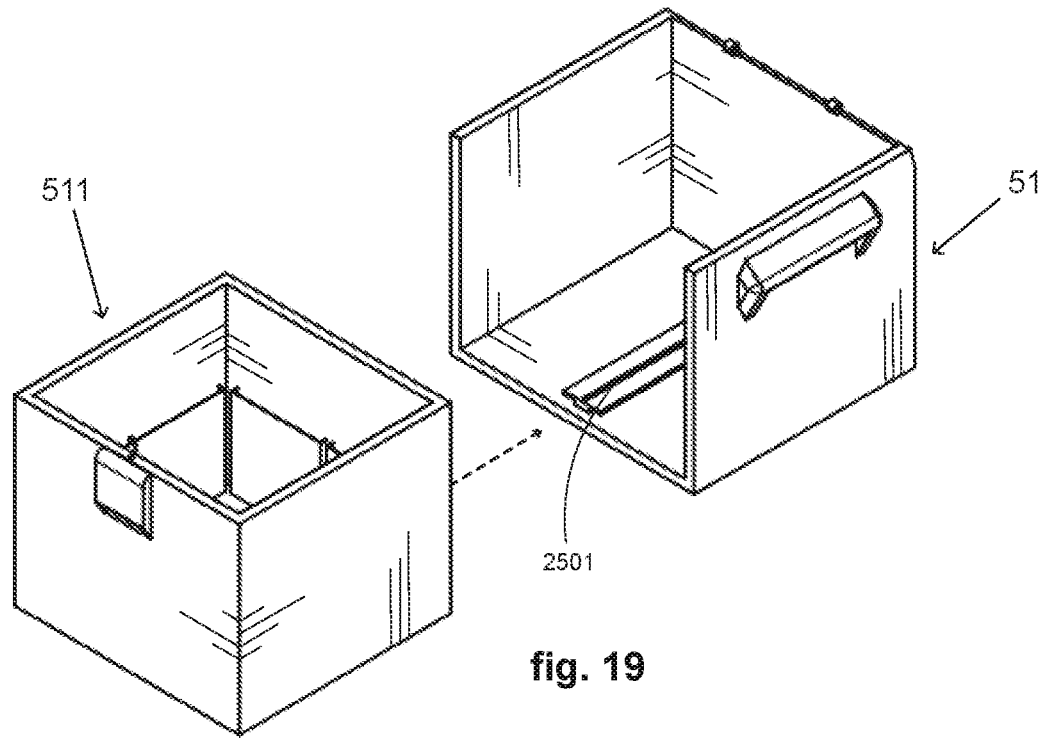

FIG. 19 shows the upper side of a bin and drawer, and the mechanism that secures the drawer in the bin. The dashed arrow indicates the direction of motion of the drawer into the bin.

Figure 20:
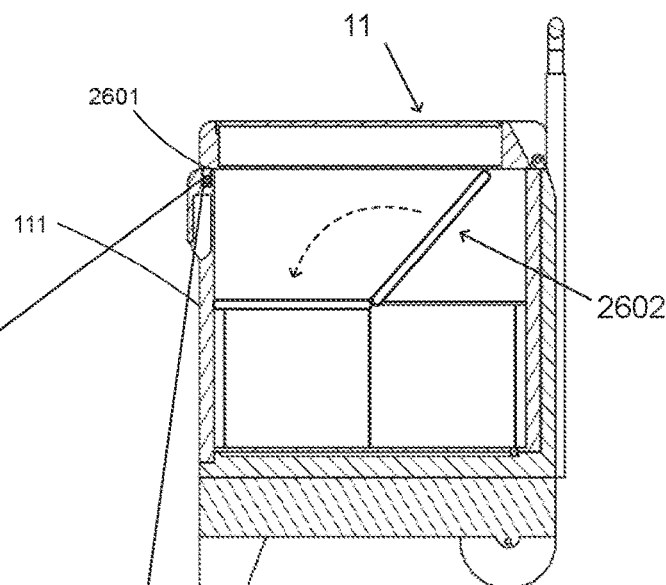

FIG. 20 is a cutaway left view of the main bin. The curved dashed arrow shows the direction of motion of the horizontal divider.

Figure 21:
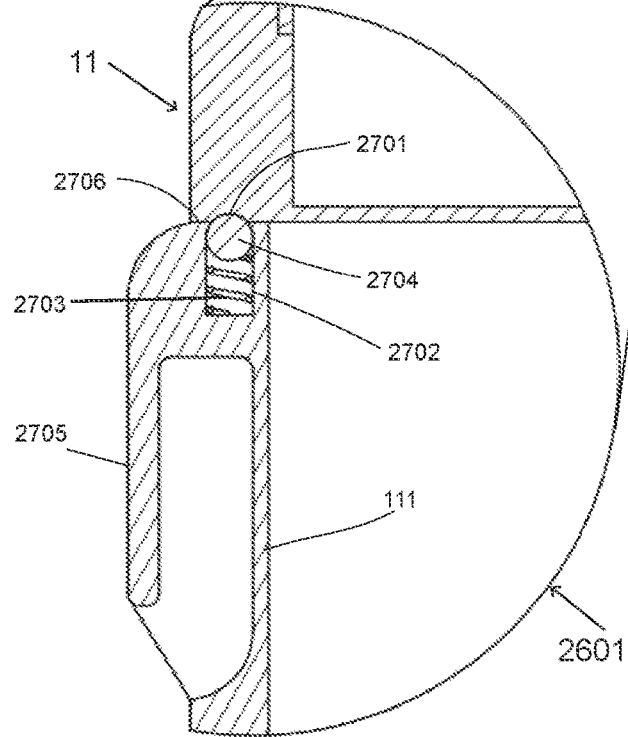

FIG. 21 is a detail from FIG. 20, showing the locking mechanism for a drawer.

Figure 22:
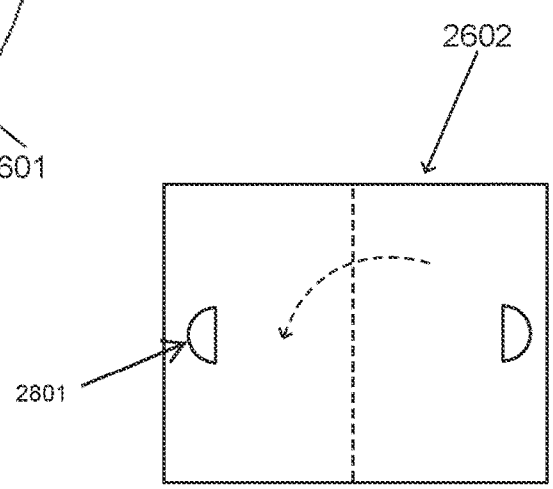

FIG. 22 is a top view of a horizontal bin divider. The straight dashed line is a fold in the divider. The dashed arrow shows the direction of motion of the divider as half of it is folded over the other half.

6. DETAILED DESCRIPTION OF THE PREFERRED EMBODIMENTS

The invention includes a main bin 11 (FIGS. 1-4). The main bin has a main bin drawer 111, at least two wheels 112, and an extendable handle 113. Note that the drawer pulls out from the front. It does not lift up from the top. The front-opening, pull-out drawer is one of the most important features of this invention. It provides easy access to the contents of the cooler even when cooler units are stacked atop one another.

The invention includes one or more modular bins 51, as introduced in FIGS. 5-9. These bins are called "modular" because each bin is a self-contained module, and the bins are designed to function together as a kit. Each modular bin, like the main bin, has a modular bin drawer 511. The modular bins fit into one another for easy stacking. Each modular bin has protrusions 512 on its bottom surface. Each modular bin has indentations 513 on its top surface. When one bin is placed on top of another one, the protrusions of the bin on top fit into the indentations on the bin on bottom. This keeps the bins securely locked into place, as shown in FIGS. 8 and 9. Note that the main bin 11 also has main bin indentations 114 so that a modular bin can fit into place atop the main bin. See FIGS. 1, 3, and 10. Each modular bin may also include a male seat belt clip at one or both rear bottom corners (not shown), so that it can be transported securely in the backseat of a car. In the best envisioned mode, these seat belt clips are detachable from the cooler, so that they may be purchased separately and attached to the bin only when needed for car transport.

FIG. 11 depicts a modular bin with a top-opening trapdoor 1302. This opens to a shallow indentation within the lid, which may be used to store sandwiches or jelly icepacks.

In FIGS. 6, 7, and 10, two vertical grooves 61 are visible in the back of a modular bin. When the modular bins are stacked atop the main bin, the extendable handle 113 fits securely within the vertical grooves 61.

When a drawer is closed, whether it be the main bin drawer 111 or a modular bin drawer 511, a locking mechanism keeps the drawer securely closed and airtight. A push of the handle releases the locking mechanism so that the drawer can be opened again.

Each drawer, whether it be the main bin drawer 111 or a modular bin drawer 511, has hollow walls. FIGS. 11 and 12 demonstrate this feature on a modular bin 51. It is understood that the main bin 11 has similar features. In these figures, the modular bin drawer 511 has drawer pocket sections 1301. The drawer pocket sections are hollow spaces within the interior walls of the drawer. The hollow spaces are used to hold jelly icepacks 1401. The drawer pocket section is composed of a thin or conducting material facing inward toward the drawer, so that heat from the contents of the drawer may be drawn into the jelly icepacks.

The bins allow the user to organize food items into specific categories according to levels of fragility and preferred temperature. Each drawer includes dividers. In one embodiment, the dividers are vertical, as introduced in FIGS. 13-15. FIGS. 13-15 depict one upper divider 1501 and one lower divider 1502. Each divider includes a divider groove 15021. The upper divider is placed into position on top of the lower divider, and perpendicular to the lower divider, so that the divider grooves fit securely into one another.

Each vertical divider is hollow. The divider pocket section 1503 is a hollow space where jelly icepacks can be inserted. FIG. 13 shows a jelly icepack 1401 being placed into a divider pocket section 1503. Each divider is composed of a thin or conducting material, so that heat from the contents of the drawer may be drawn easily into the jelly icepacks. FIGS. 16 and 17 show many various places where jelly icepacks may be positioned within a modular bin 51—within the drawer pocket sections 1301, the divider pocket sections 1503, and the trapdoor 1302, as well as the bottom of the drawer itself.

In another embodiment, the bin dividers are horizontal. FIGS. 20 and 22 show a bin with a horizontal divider 2602. This feature allows the separation of heavy items from light or fragile ones, even within the same bin, so that the heavier items do not squish the lighter ones. Half of the horizontal divider folds over the other half to provide access to the lower half of the bin. Handles 2801 facilitate lifting or opening the horizontal divider.

FIGS. 18 and 19 show the mechanism that holds each drawer securely in its bin. A modular bin is used for demonstration here; the main bin utilizes the same system. A groove 2401 in the underside of drawer 511 fits over a rail 2501 on the floor of bin 51. A stopper 2402 is situated at the rear of the groove. The stopper prevents the drawer from coming completely out of the bin.

FIGS. 20 and 21 show the location and construction of a locking mechanism, which keeps each drawer closed and airtight. The main bin is used for demonstration. The modular bins also use this mechanism. FIG. 20 is a cutaway left-plan view of the main bin 11 and its drawer 111. The locking mechanism 2601 is situated at the top of the front face of the drawer. The locking mechanism utilizes an indentation 2701 in the bin 11 and a depression 2702 in the drawer. The depression 2702 houses a spring 2703, which exerts upward force on a ball 2704. When the drawer is closed, the spring pushes the ball firmly into the indentation 2701, thus locking the drawer. In a preferred embodiment, the indentation 2701 and ball 2704 are made of ferromagnetic materials to create a particularly strong magnetic seal.

The drawer includes a latch 2705. The top of the latch forms the shape of a prong 2706. When the latch is pulled, its prong 2706 pushes down on the pin 2704, thus releasing the pin from the indentation 2701 in the bin 11. Now the drawer can open.

In its intended best mode of use, the kit will have two to four bins. Some bins will be more heavily loaded with ice packs for items that require very cold temperatures, such as ice cream. Other bins will use fewer ice packs, for items that should be refrigerated but not frozen, such as drinks. Another bin might use no icepacks at all, for the storage of heat-tolerant items such as napkins or potato chips. The bins will all be stacked atop one another on the main bin. A small modular bin will be used for fragile items such as eggs or chips. The stacked coolers will be rolled easily to a car, where they can be lifted individually into the trunk. One bin will remain in the back seat. While driving, the users can easily access the bin in the backseat. Once arriving at their destination, they can once again stack the bins atop one another and continue to wheel the cooler around outside. While the coolers are stacked atop one another, they are accessed through the front-opening drawers, as well as the trapdoor on the very top bin. At the end of the day, the users will remove the jelly ice packs and refreeze them for later use. This way, the product does not collect water, so there is no spillage through the front-opening drawers.

I claim:

1. A kit of coolers, comprising a main bin, comprising front, rear, left, right, top, and bottom surfaces, at least two wheels on the bottom surface, an extendable handle protruding upward from the rear surface, and indentations in the top surface;
    at least one modular bin, each comprising front, rear, left, right, top, and bottom surfaces, indentations on the top surface having the same size and shape as the indentations on the main bin, protrusions on the bottom surface, sized and shaped to fit securely within the indentations of another modular bin or the main bin, and vertical grooves on the rear surface, sized and shaped to securely fit around the extendable handle of the main bin;
    a drawer in each bin, opening from the front surface of the bin and comprising front, rear, left, right, and bottom surfaces;
    dividers in at least one drawer;
    and hollow pocket sections in the left, right, and rear surfaces of each drawer;
    wherein the dividers in each drawer are vertically oriented and comprise a lower divider and an upper divider, said upper and lower dividers being identical and with interlocking grooves;
    each divider having a hollow interior and at least one edge open to the hollow interior.

2. The invention as disclosed in claim 1, wherein each drawer has an underside;
    the underside of each drawer includes a groove and a stopper at the rear of the groove;
    each bin has a floor;
    the floor of each bin has a rail;
    the rail of each bin fits into the groove of one drawer, so that the drawer slides freely in and out of the bin but the stopper prevents the drawer from pulling completely out of the bin.

3. The invention of claim 2, wherein each bin and drawer include a locking mechanism, comprising
    an indentation in the center front upper portion of the bin;
    a depression in the center front upper portion of the drawer;
    a spring within the depression;
    a pin situated atop the depression and pushed upward by the spring, the pin fitting into the depression to lock the drawer when closed;
    a latch;
    a prong at the upper end of the latch, whereby lifting the latch presses the prong down on the pin, releasing the pin from the depression so that the drawer can open.

4. The invention of claim 3, wherein each drawer has an underside;
    the underside of each drawer includes a groove and a stopper at the rear of the groove;
    each bin has a floor;
    the floor of each bin has a rail;
    the rail of each bin fits into the groove of one drawer, so that the drawer slides freely in and out of the bin but the stopper prevents the drawer from pulling completely out of the bin;
    and wherein at least one bin has a top-opening lid;
    and wherein at least one divider lies on a horizontal plane and separates its drawer into an upper half a lower half;

further comprising a male seat belt clip attached to at least one corner of at least one bin.

\* \* \* \* \*